3,553,675
FLOOR COVERING FOR TRANSMITTING
ELECTROMAGNETIC ENERGY
John A. Shaver, 405 E. Park Lane, Salina, Kans. 67401;
Edwin K. Dole, 3505 Kersey Lane, Sacramento, Calif.
95825; Robert S. Osmond, 909 E. Minneapolis, St.,
Salina, Kans. 67401; and Thomas G. Morrisey, 5700
W. 28th Ave., Denver, Colo. 80214
Continuation-in-part of application Ser. No. 549,758,
Apr. 21, 1966. This application Aug. 8, 1968, Ser.
No. 751,211
Int. Cl. H02g 3/26
U.S. Cl. 340—310   15 Claims

ABSTRACT OF THE DISCLOSURE

A floor covering for transmitting electromagnetic energy in the form of signal energy or electrical power or both, the energy being received at one input location on the floor covering and transmitted throughout so that it can be supplied through a coupler that engages the floor covering which is connected to a receiving unit placed anywhere on its surface. In one embodiment, the energy is carried throughout the floor covering by a grid system of a predetermined pattern. In another embodiment, the floor covering comprises a series of laminations including an upper layer of conventional carpet-like fabric, spaced apart sub-layers of electrically conductive material separated by a dielectric layer which may serve as a propagation media for energy at microwave frequency. Electrical power transmission is increased in another embodiment by spaced apart wires embedded between certain of the laminated materials.

---

This application is a continuation-in-part of copending application Ser. No. 549,758 filed on Apr. 21, 1966, now Pat. No. 3,401,469, which was a continuation-in-part of a copending application, Ser. No. 493,345, filed on Oct. 6, 1965, now abandoned.

This invention relates to floor covering for an information dissemination system. More particularly, it relates to a floor covering capable of receiving and carrying electromagnetic energy in the form of audio-visual signals or electrical power in such a manner that either or both signals and power can be supplied to one or more receiving stations which may be moved to any location on the floor covering.

In our aforesaid parent application an educational system is disclosed wherein several channels of audio-visual signals are supplied simultaneously from a central distribution and control station to a classroom containing a plurality of student learning stations. Each learning station is equipped with various receiving equipment such as audio and video reproducers plus mechanical and electronic teaching aids and appropriate controls which enable the student to select a particular information channel being transmitted from the central station. For such a system to be effective the student learning stations must be freely movable to various locations within the classrooms to accommodate different teaching techniques and situations. Yet they must be capable of receiving the audio-visual signals and the necessary power without using conventional wire connections. The aforesaid system, therefore, requires a floor covering capable of receiving a plurality of channels of audio-visual signals and electrical power and carrying it so that receiving units for reproducing the signals such as student learning stations can be coupled with the floor covering at any location on its surface and receive the signals or power from it. A general object of the present invention is to provide a floor covering that meets the aforesaid requirements.

Another object of the present invention is to provide a floor covering that, in addition to carrying audio-visual signals and electrical power for receiving stations that can be coupled to it, will have the appearance and general wearing characteristics of conventional floor coverings such as carpets and the like.

Another object of our invention is to provide a floor covering which can receive and carry both audio-visual signals and electrical power and which will transmit such signals and power through an appropriate probe coupler that can be forced manually into the floor covering from any location on its surface. Hence, a further object of the present invention is to provide an energy-carrying floor covering that can be penetrated by a coupler probe attached to a receiving unit and which will not be damaged or rendered inoperative by repeated insertions of the coupler.

Another object of the present invention is to provide a floor covering for receiving and carrying multi-channel microwave signals which may be transmitted to receiving units located on the covering that each have appropriate coupling means and demodulator means for reproducing microwave signals in either audio or video form.

Another object of our invention is to provide a laminated floor covering having a layer serving as a transmission medium between two conductive layers and adapted to provide audio-video transmission for my receiving units placed on the floor covering having appropriate coupling means.

Yet another object of our invention is to provide a carpet or floor covering for use in carrying audio-visual signals which includes power carrying means adapted to cooperate with coupling means on a receiving station embeded completely within the floor covering and therefore are not visible on the surface thereof. With this floor covering both power and audio-visual signals are provided to a receiving unit through an appropriate coupling means that penetrates the floor covering from any location on its surface.

Another object of the present invention is to provide a flexible floor covering comprising as part of its internal structure an electrical distribution network having a multiplicity of outlets each capable of being coupled to a student learning station so that audio-visual signal information can be transmitted through the floor covering and into the audio-visual reproducers of the student learning station.

Still another object of our invention is to provide a carpet or floor covering for use in carrying audio-visual signals wherein the signal outlets adapted to cooperate with coupling means on a student learning station are embedded completely within the floor covering and are not visible on the surface thereof. In one embodiment of our invention such a carpet may be provided with a surface design indicating the location of signal outlets that are buried within the carpet or floor covering.

Yet another object of our invention is to provide an educational system where audio-visual information is generated and transmitted from a central control station through a transmission media utilizing the optical characteristics of bundled light transmitting fibers which may be woven into the structure comprising the floor covering.

A still further object of our invention is to provide a floor covering for transmitting information originated at a central control station by a modulated laser beam in such a manner that it can be received by audio-visual reproducing devices on receiving units that are movable to different locations on the floor covering.

The aforesaid and other objects of the present invention are accomplished by a unique floor covering preferably having an upper surface layer of natural or synthetic material, such as woven or piled fabric and having the same appearance and wearing qualities as conventional floor coverings such as carpets. Beneath the surface of the floor coverings so as not to be visible from above, is an energy distribution means that receives energy from an external source and can supply it at certain points on the floor covering to receiving units. In one series of embodiments of our invention the distribution network is embedded within or is supported within a layer of material below the upper layer. This distribubution network receives power or signal energy through an input coupling at the edge of the floor covering which then flows throughout the network. At a multiplicity of predetermined locations on the network are coupler devices which are each capable of cooperating with a mating device on each of a series of receiving units that are freely movable on the floor covering for transferring energy from the distribution network to the units. In another form of our floor covering, a laminated series of layers are attached to and located below the upper surface layer of fabric or some other penetrable floor covering material. Beneath the surface layer are a pair of spaced apart layers of electrical conductive material which are separated by a dielectric layer, preferably a microwave propagating material such as foamed plastic. At least the upper conductive layer is also penetrable by a sharp pointed coupler which will extend through it and into the dielectric layer to pick up microwave signal energy. Under the bottom conductive layer is an insulating base layer of non-conductive material. As will be seen from the detailed description of the invention which follows, various combinations and structural arrangements of our floor covering provide for a wide range of applications where either signal energy or power or both are required for different receiving units.

Other objects, advantages and features of our invention will become apparent from the following detiled description taken in conjunction with the drawings, in which.

Figures 1, 2:
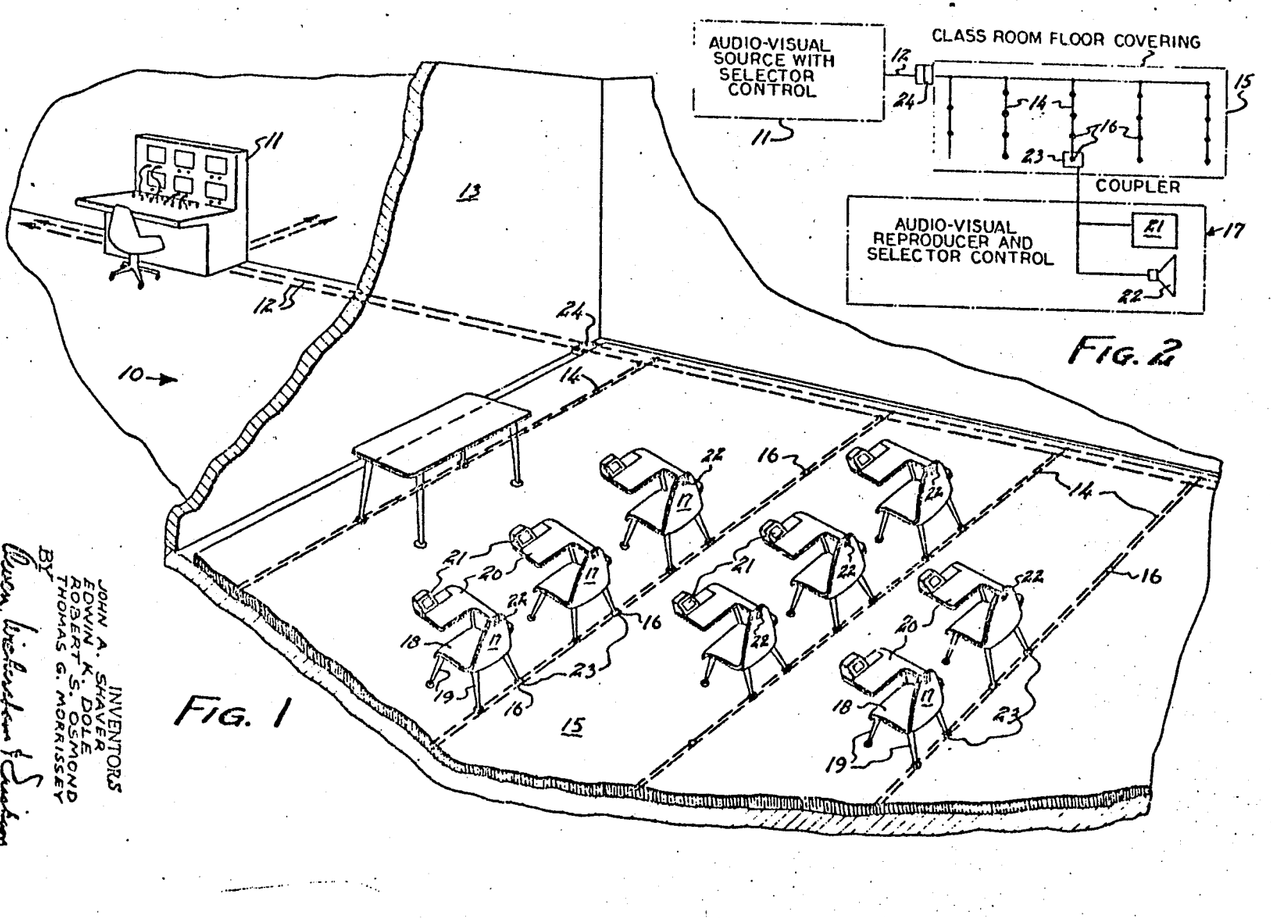
FIG. 1 is a view in perspective showing a typical arrangement of an information distribution system utilizing a floor covering embodying the principles of the present invention.
FIG. 2 is a block diagram of the system shown in FIG. 1.

With reference to the drawings, FIG. 1 shows a somewhat schematic representation of an information distribution system utilizing a floor covering 15 that embodies the principles of our invention. The system as a whole as described in our aforesaid parent application comprises a central control and distribution center where material to be disseminated can be reproduced and transmitted in the form of video or audio signals. The control center is connected by means of a suitable transmission facility 12 such as standard electrical conductors or coaxial cables to any number of localities within the building such as a classroom 13. At the classroom where the students are located and the teaching takes place, the transmission facility is connected to the floor covering on the classroom floor structure.

Generally, two forms of our floor covering are included within the scope of the present invention. In one form, the floor covering has a distribution grid or network 14 embedded within it having a large plurality of outlets 16 which may be spaced apart and arranged in any predetermined pattern thereon. In the other form, the floor covering has a laminated construction which is adapted to receive a coupler probe which will penetrate the floor covering in order to transmit signals or power to a receiving unit.

Supported on the floor covering 15 within the classroom are a plurality of receiving units 17. In the system illustrated, the receiving units are learning stations or carrels which provide complete teaching facilities for an individual student. Although such learning stations may take various forms, each essentially is a combination seat and desk type device comprising a supporting chair portion 18 with legs 19 and a desk portion 20, and each may be equipped with a video receiver 21 and an audio speaker 22 or other teaching devices which are adapted to reproduce information signals transmitted from the central information center to the floor covering. Each learning station is provided with a suitable coupling device 23 which is engageable with the floor covering to derive electrical power and/or audio-visual signals therefrom for the apparatus of the learning station. Since the information distribution center is capable of transmitting both video and audio information on several channels simultaneously, it can thereby provide different educational material to a number of learning stations. Accordingly, each such station or receiving unit is provided with appropriate controls and selector switches so that a student operator can select any one of the several information channels available and thereby receive the desired presentation from the information center.

The block diagram of FIG. 2 is representative of the generalized system described above. The information distribution device 11 includes transmitter and selector control equipment and generates the audio-visual signals which are carried by the transmission facility 12 to the classroom 13. At the classroom this transmission facility is coupled to the floor covering by means of a suitable coupling device 24. Since the distribution network 14 in the form of flooring shown has a large number of outlets 16 spaced at preselected intervals, each receiving unit can be moved to any convenient location on the classroom floor as long as its pickup coupling 23 coincides with an outlet coupling 16 in the floor covering. As will be seen, the floor covering 15 may have various constructions within the scope of the invention. However, in all cases it is provided with an upper or surface layer of flexible, linoleum-like material or a carpet-like material. The latter material is particularly desirable because of its ability to reduce noise and provide an atmosphere conductive to good educational receptivity.

In the embodiments of the invention shown in FIGS. 1—4, 6 and 7, the audio-visual signals are transmitted electrically and the central information center 11 comprises a conventional closed circuit transmitter for either video signals or audio signals or both. Thus, the transmission line 12 may be a conventional coaxial cable or broad-band transmission line capable of carrying multichannel radio frequency program signals, similar to present commercial VHF and UHF broadcast channels. On any of these television channels, picture information with accompanying sound information may be transmitted, or just pictures without sound, or sound channels without pictures.

Within the floor covering or carpet 15, the broad-band transmission line forms the distribution network 14 which is completely embedded therein so that it is invisible from above the carpet surface. The grid or network pattern 14 provides a multiplicity of the cable outlets 16 that are connected in parallel and essentially flush with the carpet surface. These outlets are spaced apart at certain intervals. Their position with respect to a certain color pattern on the rug surface may be coordinated so that they are less noticeable and do not detract from the overall appearance of the floor covering.

Figure 3:
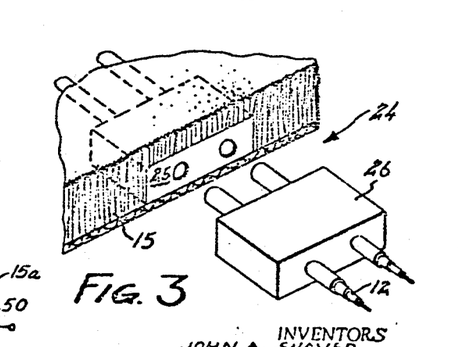
FIG. 3 is a view in perspective showing one form of a coupling of the transmission facility from the central control station to the floor covering.

In the embodiment of FIG. 3 the transmission line 12 is connected to the floor covering 15 by a suitable contact coupling connector 24. The latter is comprised of a female portion 25, preferably fully embedded within the floor covering 15, and a male portion 26 attached to an end of the transmission line 12.

Figure 4:
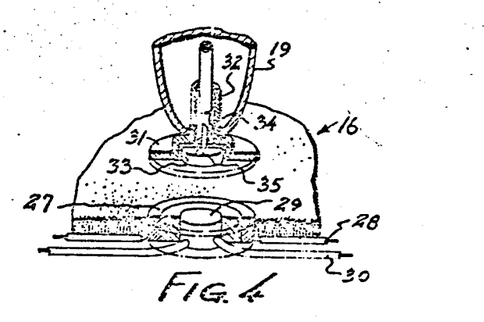
FIG. 4 is an exploded view in perspective and in section showing one form of the coupling between our floor covering and a receiving unit.

The outlets 16 for the distribution grid as shown in FIG. 4 are generally flat and thin so that they can also be embedded well within the carpet 15, and yet be readily connected to the mating connector 23 on the student learning station 17. In the form shown, the male connector 23 is fixed to the end of a supporting leg 19 of the learning station 17. The female connector member 16 embedded in the carpet has an annular conductor ring member 27 which is mounted on an insulating base member to which are connected a pair of leads 28 of the distribution network having one polarity. Spaced inwardly from the ring member is a centrally located and slightly higher stud 29 to which is connected a pair of leads 30 of the distribution grid having the opposite polarity. The lower end of the learning station leg 19 has a generally cylindrical shape and fixed to it is a conductive fitting having a flat annular conductor plate portion 31 adapted to engage the ring member 27, a central cylindrical cavity, and an upper tubular section 32 that extends upwardly into the leg 19. An insulating inverted cup member 33 fits tightly inside the central cavity and has its own cavity conforming to the shape of the stud 29. Within the leg of the study station are a pair of leads 34 and 35 which form a coaxial cable that is connected to the video and audio receivers of the learning station. One lead 34 is connected to the annular plate member 31 and the other lead 35 forms a terminal at its end within the cup member 33 which is adapted to contact the stud 29 of the female coupler 16. While the foregoing describes one form of direct connecting coupler it is to be understood that other such couplers could be used within the scope of the invention. In all such direct coupling arrangements provisions for electrical impedance matching and for compensation of voltage attenuation can be provided by application of principles well known to those skilled in the art.

In a system utilizing our floor covering, each receiving unit such as a learning station 17 is furnished with power for operating its video and/or audio receivers and other apparatus it may have, either from its own batteries or by another connection from it to a suitable remote power source. Or, in accordance with the present invention, power may be supplied through the floor covering 15 in a manner similar to that previously described with respect to information signal energy.

Two basic arrangements may be utilized in our floor covering for conveying power, one using direct current (D.C.), the other using alternating current (A.C.). Both can utilize relatively low voltages, that is, less than approximately 25 volts; or higher voltages in the order of 120 volts can be used, the only differences being the insulation requirements and the resultant current carrying capacities. The A.C. power arrangement can utilize either the standard 60 cycles per second or the higher frequencies of 400 or 1200 c.p.s. commonly used in aircraft power systems.

Figure 5:
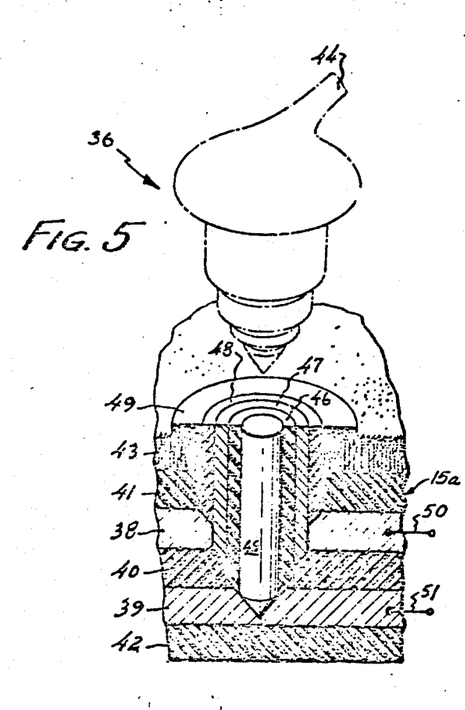
FIG. 5 is an exploded view in perspective and in section showing a penetration type of coupling between the floor covering and a receiving unit.

In FIG. 5, a floor covering or carpet 15a is shown which may be energized with power to operate a receiver unit by means of a direct coupling. In this embodiment, the floor covering 15a is comprised of laminations of conductive and insulating materials so that a power coupling member 36 on the receiving unit or learning station will make the necessary electrical connections for transmitting both power and signal energy when it penetrates the floor covering. As shown, the floor covering 15a has two conductive layers 38 and 39 separated by an insulating layer 40. A pair of top and bottom layers 41 and 42 of insulating material are adjacent to the upper and lower conductive layers, respectively. Bonded to the upper insulating layer 41, we may provide a layer 43 of carpet or some other eye appealing and penetrable composition material. The connector 36 which may be attached to a receiving unit by an umbilical cable 44 or enclosed within a supporting leg 19 is the penetrating type comprised of concentric cylindrical shells of conductive and insulating material whose ends are exposed along the lower end of the connector. The central cylindrical portion 45 is preferably of a relatively hard conductive material and has a sharp lower end that will enable it to penetrate the floor covering easily. Surrounding the center portion is a shorter insulating layer 46 and then an even shorter conductor 47 and finally a still shorter outer insulating layer 48. The latter is integral with a circular top 49 that extends outwardly from the outer layer. A pair of leads 50 and 51 for the conductors 38 and 39 carry the electrical energy from an external source to the edge of the carpet. Output leads forming the cable 44 extend from contacts at the upper end of the connector through the top portion 49. When the connector 36 is installed it is merely pressed into the floor covering 15a until its top portion 49 is flush with the carpet surface. At this position, the normally exposed end of the conductor 45 will be buried within and contact a lower conductive layer 39 of the floor covering and the exposed end of the conductor 47 will be buried within the intermediate conductive layer 38. The conductive layers of the multilayer floor covering 15a may be made from a variety of conductive materials such as metallic foil or a woven mesh or screen of fine metallic wires or conductors. For some coverings we may use conductive layers formed by current carrying granular materials such as graphite and metallic powders held together by a suitable binder. The insulating layers 40, 41 and 42 may be of any suitable nonconductive material such as flexible sheet of plastic or an insulating fabric of natural or synthetic fiber or yarn.

The aforesaid floor covering embodiment of FIG. 5 may be used in conjunction with the distribution grid superimposed on its upper layer beneath the carpet layer to provide one form of floor covering capable of both signal energy and power simultaneously.

Suitable automatic voltage regulators (not shown) may be incorporated in the reproducer devices at each receiver unit to accommodate variations of the supply power.

Figure 6:
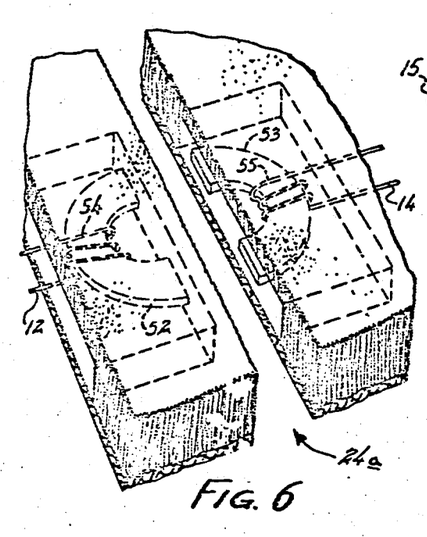
FIG. 6 is an exploded view in perspective and in section showing an electromagnetic coupling between the central control station and the floor covering.
Figure 7:
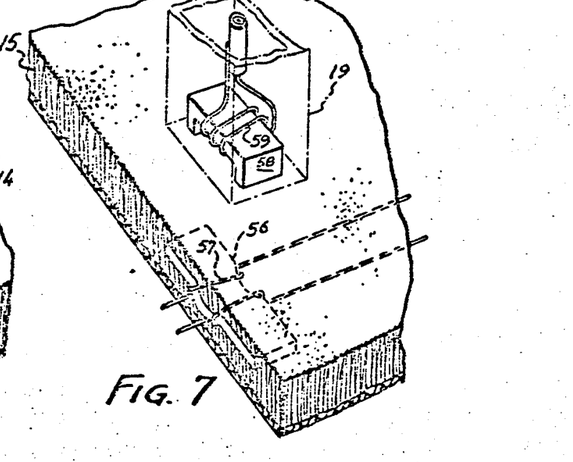
FIG. 7 is a view in perspective and in section showing an electromagnetic coupling between the floor covering and a receiving unit.

In another embodiment of our invention shown in FIGS. 6 and 7 the coupling of the transmission line 12 to the floor covering 15 and from the latter to a receiving unit 17 is done electromagnetically. This eliminates any need for connectors that physically engage each other and for connector members that are exposed on the surface of the floor covering or carpet. Such electromagnetic coupling is provided by coupling or split-core transformers which are buried within the floor covering and in a portion of the learing station that contacts the floor covering. These transformers utilize highly refined cores as ferrite cores wound with wire to produce the desired transfer characteristics. As shown in FIG. 6, the coupler 24a for coupling the transmission line 12 to the floor covering 15 comprises a pair of transformer cores 52 and 53 which are oriented directly opposite each other when the floor covering is properly installed. The winding 54 on the core 52 is connected to the transmission line 12 and the winding 55 on the core 53 is connected to the distribution network lead 14 within the floor covering 15. The transformer 52 on the transmission line is preferably fixed near the periphery of a classroom and the transformer core 53 is embedded within the floor covering at some convenient location along its periphery so that it can lie adjacent to the transformer 52 in a normal installation.

Within the floor covering such as a woven carpet the distribution network 14 is provided in a predetermined pattern, as previously described. However, instead of the exposed connectors, a core 56 forming one half of a coupling transformer, as represented in FIG. 7, is enclosed in a winding 57 which is connected to a lead forming part of the network 14. This core 56 is buried completely within the floor covering 15 and is therefore not visible. However, the upper surface of the floor covering may be marked in such a fashion as by the carpet design to indicate the locations of each of the electromagnetic couplers buried within it. In this embodiment each learning station 17 has an electromagnetic coupler comprised of a core 58 which is preferably installed completely within one of its supporting legs 19 or which is otherwise attached to it. A winding 59 on the core 58 is connected to a circuit that includes the video and audio receivers for the station along with a signaling channel used by the student for selecting the desired information at the central control station. Thus, it is seen that in this embodiment each student learning station 17 can be moved freely about the classroom and whenever it is positioned over a marked location of a buried electromagnetic coupler 56 within the floor covering, it will receive the video and audio signals being transfitted from the control center 11, and, when necessary, it will convey the selector signal back to the control center.

Figures 8, 9:
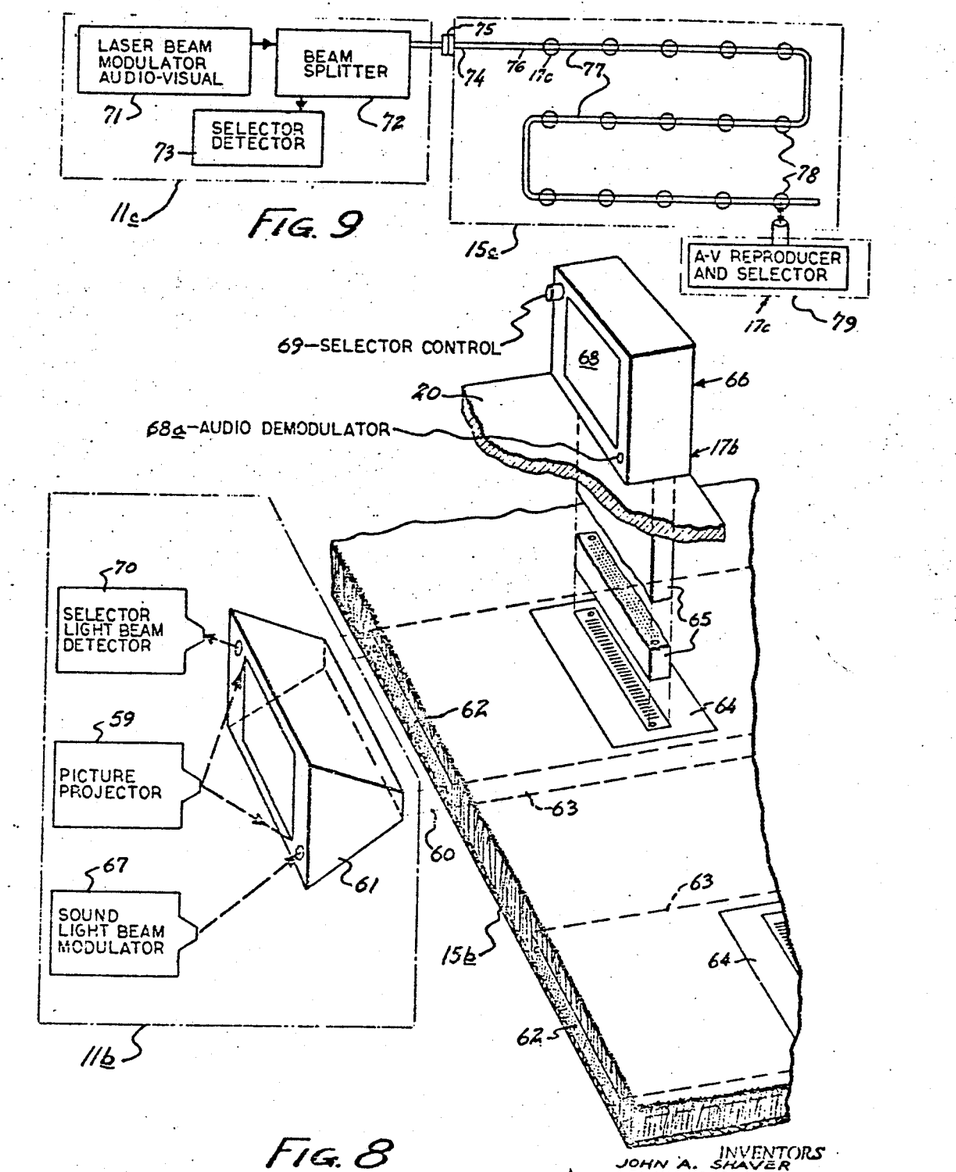
FIG. 8 is a view in perspective showing an information distribution system according to the present invention utilizing glass fiber bundles as an information transmission facility.
FIG. 9 is a block diagram and schematic plan view showing schematically another system embodying the principles of the invention and utilizing a laser type transmission system.

In yet another embodiment of our invention shown in FIG. 8, visual information channels are established through a floor covering 15b such as carpeting by a transmission phenomenon commonly referred to as "fiber optics." Here, the source of pictures is in the form of light patterns generated or originated at the audio-video central control location 11b. The picture to be transmitted may be introduced by a picture projector 59 into a bundle 60 of glass-like fibers at a transforming unit 61. The latter is connected to a cross section of the ends of the fiber bundle, the extension of which forms a transmission line. At this transforming unit the light images from the picture projector are broken down geometrically into a number of very small parts of the whole image with the cross-section end of the bundle being placed in front of the image dividing elements so that each incremental part of the total image is transferred to an individual filament of the fiber optic bundle. This individual filament then carries that part of the entire image to whatever location it is physically directed. The shape of the bundle of filaments 60 in cross section can be varied to meet specific requirements. For example, a bundle of filaments when grouped together to pick up the original image may be in the form of a rectangular cross section, but in carrying the incremental images to another location the filaments can be laid side by side so that the bundle then would be in the form of a ribbon 63 which could be embedded within a floor covering material such as a carpet. In some instances, the fibers may be spread out and woven into the carpet as individual filaments. When the bundle 60 of filaments is brought together at a location where the image is to be reproduced, they must again be grouped into a rectangular cross section and in the same orientation as the original cross section of the fiber bundle when the image was placed on the filaments.

In the arrangements shown in FIG. 8, the bundle of filaments 60 (transmission line) from a central audio-visual station 11b is coupled by means of a flat optical connector 62 at the perimeter of the carpet 15b to a similar bundle or ribbon 63 of filaments which may be woven directly into the carpet. At spaced apart locations along these distribution bundles 63 which are within the carpet, flat optical transformer connectors 64 are provided which provide a means for transferring audio-visual information from the carpet to a student learning station, and also a selector signal from the student station back to the control center. An optical coupling device 65 which can be aligned with a flat optical connector is connected to a reproducer unit 66 on the desk 20 of a student learning station having a display viewer 68, which furnishes the viewer with the flow of visual information from the distribution bundle 63.

The audio information associated with the picture information in this embodiment of our invention may also be carried thorugh a filament in the form of a modulated light wave. A sound light-beam modulator 67 for sending the audio signals is provided at the control center. At the learning station the audio modulated light wave is converted by a demodulator unit 68a within the reproducer unit 66 to an audible signal and is reproduced for the listener in the same manner as described for the radio frequency distribution system.

This same method of transferring information for the audio channel can be used in conjunction with a selector control 69 on the reproducer unit 66 for sending coded information back from the student learning station 17b to the audio-video control center 11b, thereby enabling the student to select the particular information desired. This control is operable in combination with a selector light beam detector 70 at the control center to provide the information selection feature.

Aside from the advantage that the fiber optic bundle can be woven into the carpet structure it has another unique feature in that it can convey different colored light images as well as monochrome or ordinary black and white images.

Still another method by which information can be carried through a floor covering 15c, as shown in FIG. 9, in accordance with the principles of the present invention is by means of a transmission system commonly referred to as laser transmission. In a very general way laser transmission can be compared with radio frequency transmission because laser waves are similar to radio waves. Laser waves, like radio waves, are continuously oscillating waves referred to otherwise as coherent light waves and in this regard are similar to radio waves. This permits them to have information superimposed on them in a manner similar to placing information radio waves and likewise the information that is superimposed on them can be derived and reproduced by a detection device so that the wave itself then becomes a carrier of information from an interrogated source or an initiation source to a destination where that source is to be reproduced.

Since laser waves are such extremely high frequencies, they are capable of carrying a very great number of individual information channels which are separable by means of frequencies selection. Also, since laser waves behave as light waves they can be handled as light energy through the weave of a carpet in a manner very similar to that previously described with respect to the conveyance of light images by fiber optics. Thus, a floor covering or carpet may be provided with interwoven filaments of glass rods to convey the laser waves or the carpet may be provided with a sheet of laminated plastic that could be used as an undercovering to the top carpet surface.

The block diagram of FIG. 9 illustrates an embodiment of the present invention which employs laser transmission from a central control station 11c through the floor covering 15c and into a student learning station 17c. As shown, a laser beam modulator 71 providing both audio and visual signals to a laser beam is located at the central transmission station and is connected to a beam splitter 72. A selector and detector device 73 is connected to the beam splitter to provide selection of the transmitted information. The output of the beam splitter 72 is fed to a transmission tube 74 wihch extends between the central transmission station and the classroom. At the classroom the transmission tube is coupled by means of a coupler 75 similar to that employed for the fiber optics to the floor covering 15c of the classroom. Within the floor covering is a distribution line 76 capable of transmitting a laser beam interconnecting a plurality of spaced apart outlets 77, each one of which is capable of accommodating a student study station 17c. By means of a flat light transformer coupler 78 within the leg or attached to some other convenient portion of the student study station, an audio-visual reproducer and selector unit 79 on the study station is coupled to the distribution line 76 within the floor covering. The audio-visual reproducer and selector device can be controlled by a student at the learning station in a manner similar to the other previously described audio-video-signaling reproducer units.

In yet another form of the invention, a laminated floor covering or carpet material 80, shown in FIGS. 10 to 13, is provided which is capable of transmitting either laser waves, as previously described, or which can serve as a microwave transmission medium. In addition, it may also provide for the transmission of electrical power for use in operating study stations, as described above with respect to FIG. 5. In its broadest sense the floor covering 80, according to our invention, comprises a pair of spaced apart layers 81 and 82 of a suitable electrically conductive material. Such layers may be made from metal foil or woven metal strands, or particulate metal or conductive material bonded together to provide a flexible conductive sheet. The upper conductive layer 81 is used to establish an electric ground plane. These layers 81 and 82 may vary in thickness depending on the conductive material used and the particular application of the floor covering 80. Between the layers 81 and 82 we provide a layer 83 of dielectric or insulating material that spaces the conductive layers apart by some predetermined specific dimensional relationship, so that either laser waves or electromagnetic energy at microwave frequencies can be transmitted through the layer 83. This signal carrying layer 83 is preferably made of a light, flexible plastic such as any of the well-known foamed or clear plastic materials having low signal attenuation properties. Bonded to the lower conductive layer 82 is an insulating layer 84 that is preferably made of some flexible, non-inflammable plastic material. A layer 85 of similar material is bonded to the upper conductive layer 81 and provides a support structure to which a woven or tufted exterior fabric or carpet material 86 may be attached, either by bonding or other means. Between the exterior layer or carpet material 86 and the layer 85, a fluid sealing layer 87 is preferably provided. This latter layer may be a flowable or gummy type substance such as a relatively thin layer of partially cured rubber, as used in puncture proof tires, which will flow together to close holes that are made by penetrating couplers during the use of the floor covering.

Figure 14:
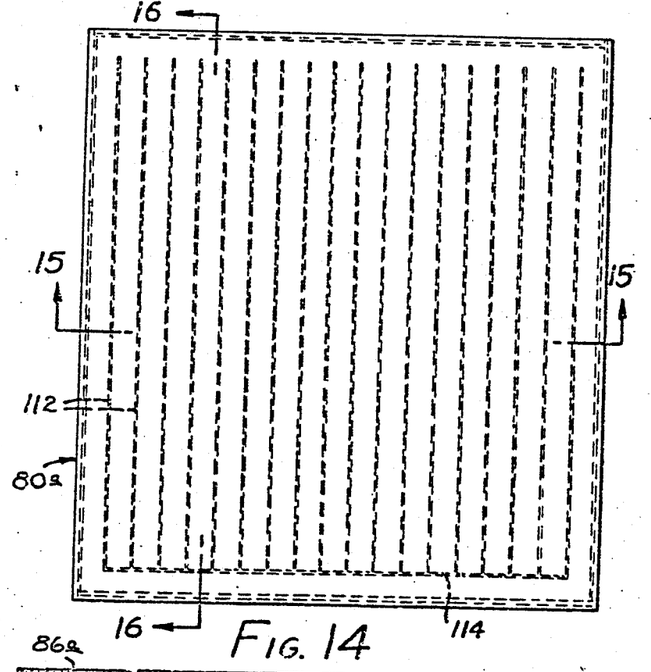
FIG. 14 is a plan view of another form of floor covering according to the principles of the present invention.
Figures 15, 17:
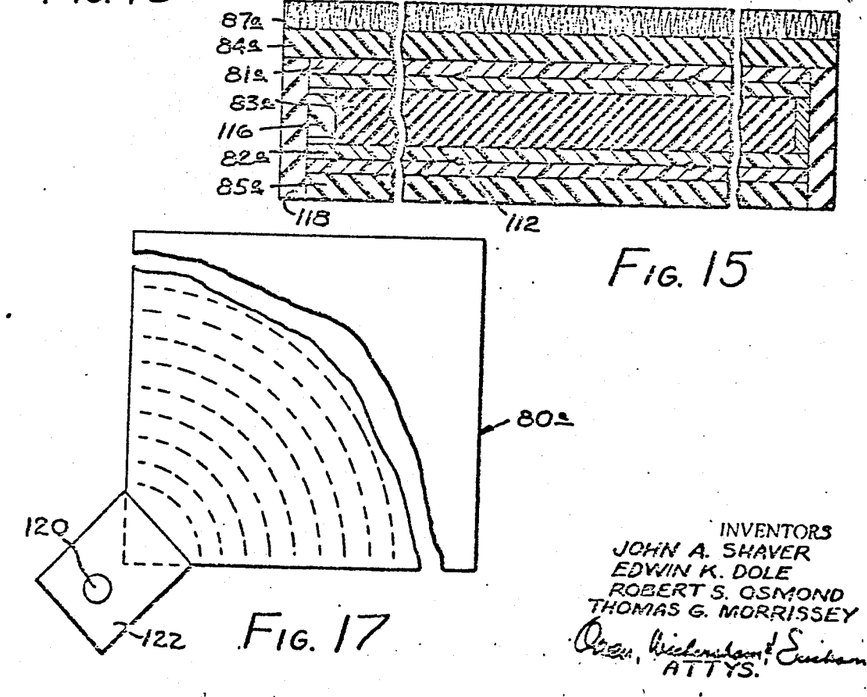
FIG. 15 is a view in section taken along line 15—15 of FIG. 14.
FIG. 17 is a diagrammatic view showing one arrangement for connecting the input wave guide to a floor covering as shown in FIG. 14.
Figure 16:
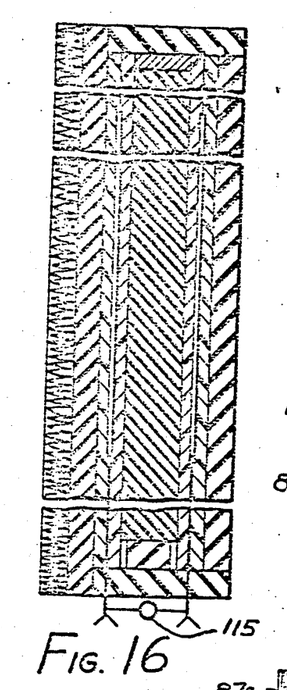
FIG. 16 is a view in section taken along line 16—16 of FIG. 15.

In FIGS. 14–16, another form of laminated floor covering 80a is shown which transmits both signal energy and electrical power. In this embodiment the floor covering is similar to the floor covering 80 except that a multiplicity of fine, conductive, bare wires 112 in a gridlike configuration are embedded within each of two vertically spaced apart layers 81a and 82a of electrically conductive material. Here, the conductive layers 81a and 82a are preferably made of a conducting plastic material of substantially uniform thickness. Various conducting plastic materials are available commercially which have different conductivity characteristics. The wires 112, preferably comb-style copper (e.g., No. 14), are parallel and horizontally spaced apart at relatively close intervals within the conductive layers, as shown in FIG. 14, so that a probe coupler inserted within the floor covering will come near at least one wire 112 no matter where it is inserted into the floor covering. If the coupler is small for the spacing of wires in the floor covering (e.g., a ⅛" diameter coupling with wires spaced at 2" apart), it may be desirable to use a multiprong coupler, as shown in our copending divisional application Serial No. 751,212 filed on Aug. 8, 1968. In any event, with a proper coupler, current from an external source supplied to the conductive layers and the embedded wires will always find a low resistance path to a coupler probe member. If highly conductive sheet material is used, the spacing of the copper wires 112 can be increased so long as the power transmission requirements for the floor covering are not exceeded. Essentially, these wires serve to increase the current carrying capacity of the floor covering by reducing the resistance of the current path through the conducting plastic. Consequently, they allow a less expensive plastic sheet material having a relatively low conductivity to be used. Along the edges of a section of the floor covering 80a the wires 112 are connected in parallel to a bus wire 114 that is coupled to an external power source 115. This bus wire can be a standard slide-over R.F. shield which is very flexible and flat. The power is applied so that there is a potential between the wires 112 in the two layers 81a and 82a, but there is, of course, no potential between the wires in one conductive layer.

As shown in FIGS. 15 and 16, a microwave propagating dielectric material 83a is provided between the layers 81a and 82a which can be made from various wave propagating materials such as a flexible foam plastic sheet or silicon rubber. Along each edge of a section of floor covering 80a a strip of microwave absorbing material such as 116 is provided betweeen the conductive layers 81a and 82a. Also, an edge strip 118 of a suitable insulating material is fixed to the outside of each absorbing strip and layers 84a and 85a of similar insulating material are fixed to the conductive layers 81a and 82a, respectively. A layer 86a of carpet pile and a fluid sealing layer 87a are supplied to floor covering 80a in the same manner as applied to the covering 80.

As stated, the floor covering materials 80 and 80a may be used in an information dissemination system according to the present invention wherein the signal transmission medium is electromagnetic energy at microwave frequencies. Use of this medium makes it possible to transmit a large number of information channels from a transmission control center through a signal feed point at the periphery of a carpet or floor covering section.

Figure 10:
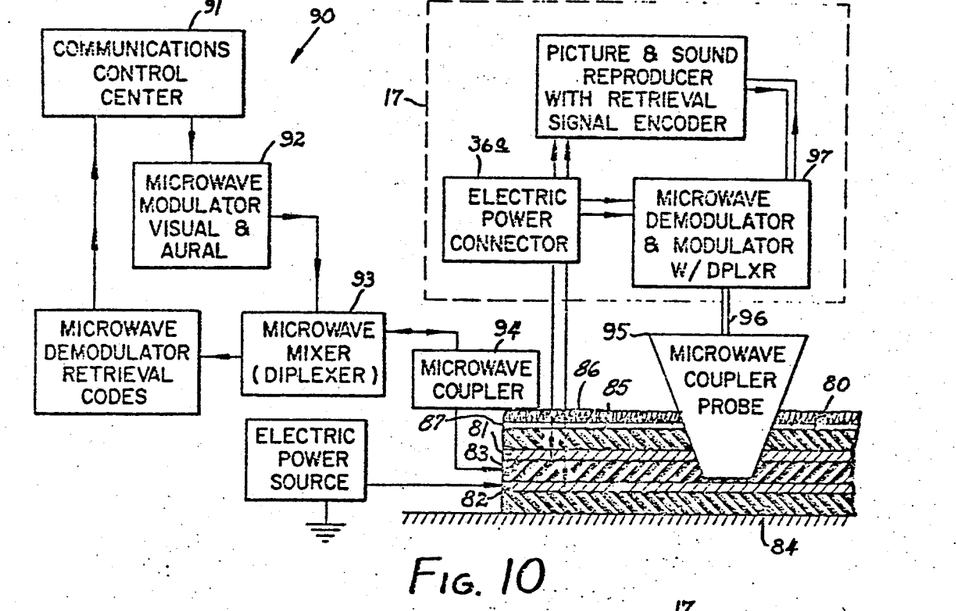
FIG. 10 is a block diagram of an information dissemination system according to our invention and utilizing a microwave transmission system.
Figure 11:
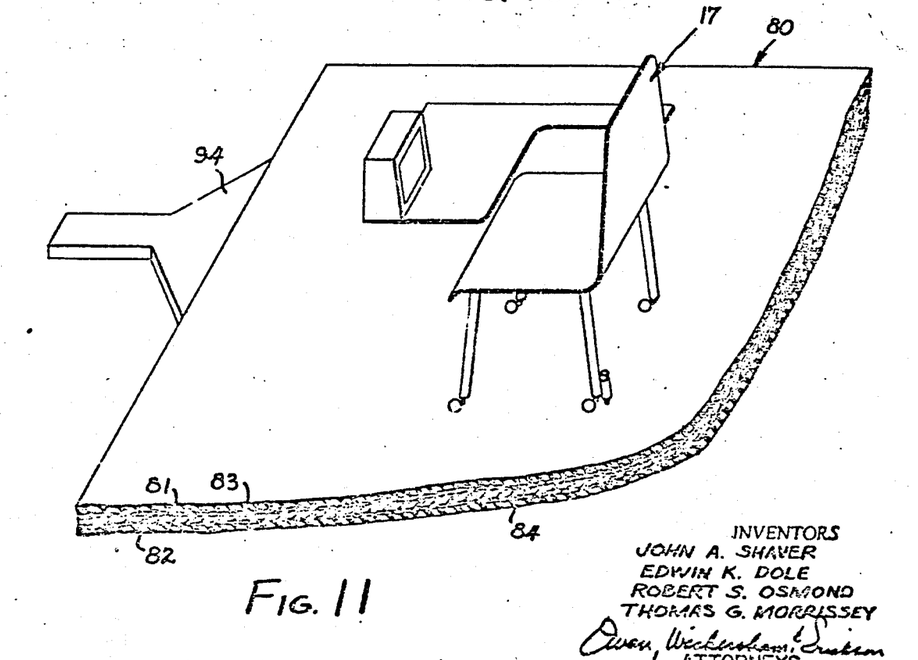
FIG. 11 is a fragmentary view in perspective showing a portion of floor covering embodying principles of the invention and a microwave coupler connected thereto.

A block diagram illustrating a microwave information dissemination system 90 embodying the principles of the invention is shown in FIG. 10. The various microwave components of the aforesaid system 90 may be of conventional construction according to known state of the art principles and for that reason and to conserve space are not described herein in detail. From a central communicatitons control center 91 the preselected visual and/or aural information is sent to a microwave modulator 92 where it is put in the form of multi-channel microwave signals. This electromagnetic signal information is fed to a microwave mixer or diplexer 93 and thence through a coupler device 94 that feeds the electromagnetic microwave signals into the floor covering 80. FIG. 11 shows how such a feed coupler may be attached to the edge of the floor covering. In the floor covering the conductive layers 81 and 82 function as wave guides which allow the microwave signals to be propagated throughout the floor covering. To provide maximum efficiency in the retrieval of microwave energy by a receiving unit coupled to our laminated floor covering, it is preferable to excite a mode with the electrical field that is perpendicular to the horizontal boundaries, namely TEM or TEmo mode. The theory of the sectoral horn may be applied to our floor covering construction and in this instance the excitation is made at a corner, resulting in a horn of 90°. The calculation of the minimum "throat" dimension for a corner input device shows that standard commercial coaxial cable to the waveguide adapter should be modified so that the widths of the adapter and the dielectric will be the same. FIG. 17 shows schematically, the transitions from a coaxial input cable 120 through a waveguide input adapter 122 to the floor covering 80a. The mode of propagation is shown in the same figure. Within the conducting edges 116, the sectoral horn mode is excited. In the far region from the excitation it is much like the transverse electromagnetic (TEM) mode with circular wavefronts varying like one-half periods of sinusoid from one edge to the other. Here, the edges of the floor covering are made from an absorbing type of material to prevent any reflection of waves. Other modes of propagation and ways of exciting the similar mode may be used within the scope of the present invention. On the surface of the floor covering, receiving units such as the study stations 17 heretofore described, are movable to any convenient location. Essentially, each is equipped with a microwave coupler probe 95 connected by a suitable waveguide transmission means 96 to a combined microwave demodulator and modulator 97 having a diplexer for handling both the received signals for use by the study station and also signals transmitted from the study station back to the control station 91. A suitable power connector 36a. such as the penetrating type connector 36 shown in FIG. 5, may be used to penetrate the floor covering 80 and provide power for operating the study statiton components including video and audio receivers, other teaching machines and a retrieval signal encoder for return transmissions. Or, a multi-prong coupler for transmitting both signals and power, as previously mentioned, may be used.

Figure 12:
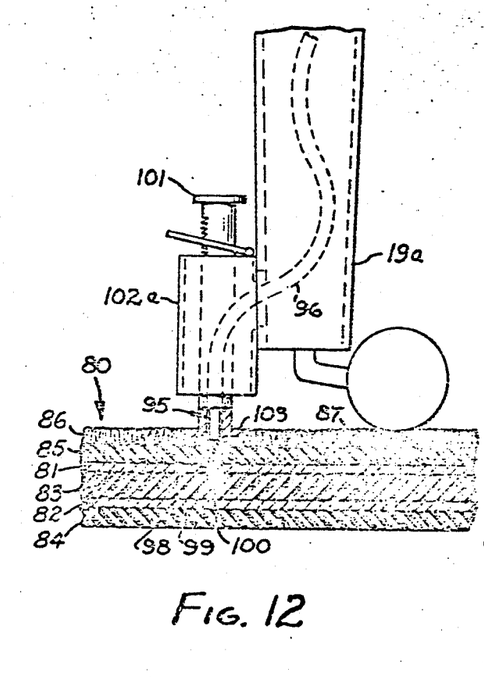
FIG. 12 is a fragmentary view in cross section showing a portion of a form of laminated floor covering embodying the principles of the invention with a microwave coupler shown in place.

The coupler probe 95, shown in some detail in FIG. 12, provides one solution to the problem of transmitting the microwave signals from the floor covering to a receiving unit that can be freely moved to any position on the floor covering. In the form shown, the probe comprises essentially a piece of metallic pipe 98 forming a hollow wave guide having the proper cross-sectional shape and size to be compatible with the wave length, frequency and mode of the electromagnetic microwave energy being transmitted through the floor covering. Near its lower end a metal rod or probe tip 99 projects into the center of but is insulated from the wave guide 98 or resonant cavity. The probe tip 99 is used to provide the necessary coupling to the external circuitry of the study station for the injection into or extraction of energy from the directric layer 83 between the conductive layers 81 and 82 of the floor covering 80. The lower end of the probe tip 99 extends below the wave guide section of the coupler and is encased in a relatively hard dielectric plastic material 100 that protects the probe tip and keeps it centered while enabling the entire coupler probe 95 to be forced into the floor covering each time the receiving unit is moved to a new location on it. At its upper end the wave guide is attached in some suitable manner to the study station 17 and is connected to the wave guide plumbing which leads to the demodulator and modulator unit. Various arrangements may be made for this plunger, and the one shown in FIG. 12 is merely illustrative. Here, the wave guide pipe 98 is fixed within a foot operated plunger 101 that is movable mounted within a plunger body 102a attached to the leg 19a of a study station 17a. A suitable stop means such as a flange 103 on the wave guide pipe automatically positions the probe tip within the dielectric layer 83 when the flange 103 bears against the floor covering surface. The upper end of the wave guide pipe is attached to a flexible signal conductor or wave guide transmission means 96, such as the metallic bellows type. Preferably this extends upwarly through a cavity in the leg 19 to the modulator and demodulator unit 97.

A plunger type coupler 105 for a laser transmission system may be utilized with the floor covering 80 and also with a laser modulator-demodulator unit connected to audio and video receivers in a study station or the like as previously described with reference to FIG. 9.

Figure 13:
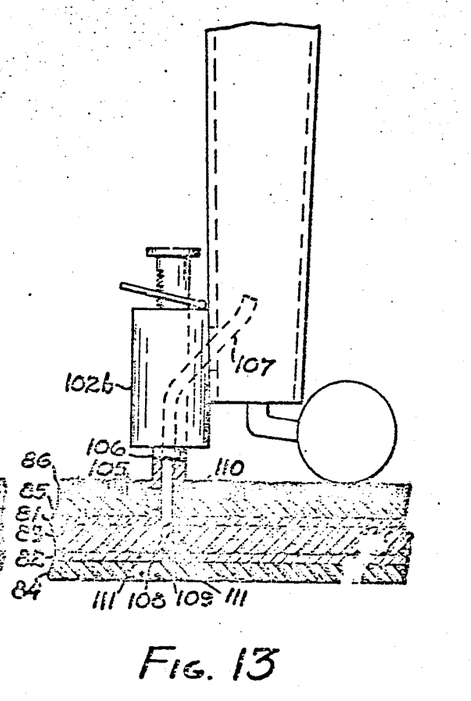
FIG. 13 is a fragmentary view in cross section showing the floor covering of FIG. 12 with a penetrating coupler probe for use when laser waves are the transmission medium.

The laser plunger coupler 105 comprises a solid rigid rod made of relatively hard clear plastic or glasslike material similar to material sold under the trademark Lucite. As shown in FIG. 13, the rod may be fixed in a movable plunger 106 which is mounted within a plunger body 102b. At its upper end the rod is connected to a flexible light wave conductor 107 of plastic or glass fiber material that preferably extends within the leg of a study station to the laser modulator-demodulator (not shown in FIG. 13). At its lower end, which is adapted to penetrate the floor covering 80, the plunger coupler 105 has a front surface 108 facing the source of laser energy entering the floor covering that is beveled at an angle to the longitudinal axis of the rod. From the lower tip of the rod 105 which is the lower edge of the beveled surface a curved rear surface 109 extends upwardly. A frontal surface 110 above the front beveled surface 108 and the curved surface 109 are both coated with a layer 111 metal material that serves as a focusing reflector. A suitable stop such as the flange 103 also serves here to position the beveled surface of the rod 105 within the dielectric layer 83. Thus, the laser energy striking the beveled 108 end of the rod 105 in the dielectric layer 83 of the floor covering 80 enters the probe only at this beveled surface. It impinges on the curved surface 109 whose curvature is such to reflect the energy directly upward through the plunger and thence through the conductor 107 to the demodulator of the particular study station.

It is apparent that for the best reception the beveled surface 109 should be directed towards the input source of light energy entering the floor covering. To provide the adjustment to take care of this directional factor the rod 105 may be rotatable once it is inserted into the floor covering and thus the maximum signal can be received despite the position of the study station.

Other forms of penetrating couplers may be used for the foregoing embodiments of FIGS. 10–17 and the plunger type arrangement shown is merely one illustration of a workable structure.

We claim:

1. A floor covering for use in transmitting electromagnetic energy to one or more receiving units located on its surface and connectable to the floor covering by means of a coupler probe that can penetrate the floor covering at any random location thereon, comprising:
   a pair of layers of electrically conductive material evenly spaced apart throughout the floor covering;
   a central layer with a predetermined and precisely uniform thickness located between said conductive layers and made of a plastic material having low microwave attenuation properties;

means for connecting said conductive layers to a source of electrical power so that a potential difference exists between said conductive layers;

an upper insulating layer of electrically non-conductive material extending over the upper conductive layer and a lower insulating layer of non-conductive material extending under the lower conductive layer.

2. The floor covering as described in claim 1 including an upper layer of woven fabric material forming a carpet-like surface.

3. The floor covering of claim 1 including a fabric material tufted into said upper insulating layer.

4. The floor covering of claim 1 wherein said dielectric layer is a foamed plastic material.

5. The floor covering of claim 1 wherein at least once of said conductive layers is malleable metallic foil penetrable by a coupler probe.

6. The floor covering of claim 1 wherein at least one of said conductive layers is a woven metallic material penetrable by a coupler probe.

7. The floor covering of claim 1 wherein the upper conductive layer includes means for electrically grounding it to adjacent building structure.

8. The floor covering of claim 1 including a moisture protection layer of gum-like non-conductive material between the upper insulating layer and the fabric material for covering openings left by penetrations of coupler probes.

9. The floor covering of claim 1 wherein at least one of said conductive layers of substantially uniform thickness is comprised of fine metallic wire strands.

10. The floor covering as described in claim 1 wherein at least one of said conductive layers is comprised of an electrically conductive plastic material of substantially uniform thickness.

11. The floor covering as described in claim 1 including coupling means for receiving or transmitting microwave energy propagated through said central layer of dielectric material between said conductive layers.

12. A laminated floor covering for transmitting electrical energy comprising:

a pair of evenly spaced apart layers of electrically conductive material;

a pair of wire grids each in direct contact with one of said conductive layers, each wire grid being comprised of a plurality of spaced apart bare wires;

means for connecting said wire grids to an electrical power source so that a potential exists between the wire conductors in contact with one conductive layer with respect to the wire conductors in contact with the other conductive layer;

a central layer of dielectric material between said conductive layers; and upper and lower insulating layers of electrically non-conductive material forming the upper and lower surfaces of said floor covering.

13. The floor covering as described in claim 12 wherein said wires are substantially parallel and spaced at around two inches apart.

14. The floor covering as described in claim 12 wherein said conductive layers are conductive plastic material and each said wire grid is embedded within one conductive layer.

15. The floor covering as described in claim 12 including strips of microwave energy absorbing material located between said conductive layers along the sides of the floor covering.

References Cited
UNITED STATES PATENTS

| | | | |
|---|---|---|---|
| 1,824,663 | 9/1931 | De Munbrun | 340—277X |
| 2,567,431 | 9/1951 | Halstead | 179—82 |
| 2,721,312 | 10/1955 | Grieg et al. | 333—84 |
| 3,288,912 | 11/1966 | Hussey | 174—70 |

DONALD J. YUSKO, Primary Examiner

M. SLOBASKY, Assistant Examiner

U.S. Cl. X.R.

174—70; 333—84; 340—273